United States Patent [19]

Holl et al.

[11] Patent Number: 4,485,155

[45] Date of Patent: Nov. 27, 1984

[54] STORAGE ELEMENT FOR ELECTRICAL ENERGY

[75] Inventors: Walter Holl, Stuttgart; Adolf Mandel, Weinstadt, both of Fed. Rep. of Germany

[73] Assignee: Robert Bosch GmbH, Stuttgart, Fed. Rep. of Germany

[21] Appl. No.: 470,473

[22] Filed: Feb. 28, 1983

[30] Foreign Application Priority Data

Apr. 23, 1982 [DE] Fed. Rep. of Germany ....... 3215126

[51] Int. Cl.$^3$ ............................................. H01M 6/14
[52] U.S. Cl. .................... 429/194; 429/196; 429/201; 307/109
[58] Field of Search ............... 429/194, 196, 221, 209, 429/218, 197, 212, 199, 201; 307/109; 361/433

[56] References Cited

U.S. PATENT DOCUMENTS

| | | | |
|---|---|---|---|
| 3,490,952 | 1/1970 | Balagner | 429/136 |
| 3,758,338 | 9/1973 | Selis et al. | 429/103 |
| 3,852,113 | 12/1974 | Yokota et al. | 429/194 X |
| 4,041,220 | 8/1977 | Armand | 429/194 X |
| 4,143,214 | 3/1979 | Chang et al. | 429/194 X |

FOREIGN PATENT DOCUMENTS 36118 9/1981 European Pat. Off. .

*Primary Examiner*—Anthony Skapars
*Attorney, Agent, or Firm*—Frishauf, Holtz, Goodman & Woodward

[57] ABSTRACT

An electric energy storage element having a housing and at least two ion pervious graphite electrodes connected by an ion-containing electrolyte. The storage element may be used as a secondary battery or as a condenser. During charging, the ionic component of the electrolyte forms ions which are implanted in the graphite electrodes.

12 Claims, 3 Drawing Figures

STORAGE ELEMENT FOR ELECTRICAL ENERGY

The present invention relates to a storage element for electrical energy, employing improved materials and design which result in longer life and lower costs.

BACKGROUND OF THE INVENTION

A secondary battery is known, with electrodes made of reversible electrochemically doped, conjugated polymers, from European patent application No. EP-A-0036118. The electrodes described therein are made especially of a doped polyacetylene, with the electrolyte containing an ionizable compound in which anionic and cationic dopants for the electrodes can be used. The use of polyacetylene as an electrode material has the disadvantage of being relatively expensive and that it inhibits a low electrical conductivity in its undoped state. Furthermore, it is relatively sensitive to water and oxygen. This results in handling difficulties of polyacetylene, which together with the required encapsulation of electrode elements made from it, makes such units relatively expensive.

It is an object of the present invention to provide a storage element for electrical energy which will have improved life expectancy and improved electrical performance, as well as lower costs.

THE INVENTION

The invention provides an electrical energy storage element comprising a housing containing at least two electrodes in contact with an ionic electrolyte. Electrodes comprise an expanded graphite which, when the electric energy storage element is used for storage of electrical energy, contains ions implanted within the expanded graphite (within the graphite lattice). The ions are implanted from the electrolyte during charging of the electric storage element.

The electrolyte preferably comprises an electrically conducting salt in a polar solvent. The electrically conducting salt is preferably a salt which ionizes to form ions having a single valence. The chlorides and perchlorides of lithium, potassium, sodium, and tetraalkylammonium are particularly preferred. The concentration of the conducting salts in the electrolyte is in an amount of from 0.5 mol per liter of electrolyte up to saturation with between about 0.5 mol and 1.5 mol being preferred. The polar solvent is preferably propylene carbonate, gamma-butyrolactone or dimethylformamide. During implantation of the ions into the graphite, the graphite expands. Such expansion may be minimized by pressure application as described hereinafter. Such graphite expansion during ion implantation can be controlled so that it is significantly smaller when the graphite has been doped with $FeCl_3$ prior to ion implantation which occurs during charging of the storage element. Storage elements in which the graphite has already been doped with $FeCl_3$ also have the advantage of having a higher storage capacity for the ions of the conducting salt from the electrolyte.

The expanded graphite, which is used to form the electrodes, is a graphite which is pervious to ions from the electrolyte during charging. This may be an expanded sheet graphite or porous graphite powder, etc. The use of expanded or porous graphite permits better access of the electrolyte to all of the graphite comprising the electrode. The actual entry (implantation) of the ions into the graphite is an entry into the graphite lattice, which results in increase in volume thereof as discussed hereinbefore. The electrode be formed from highly graphitized fibers. For further details see hereinafter.

The materials and means for doping, charging and operating the electrical storage element of the present invention is the same as or are at least similar to that of the prior art, for example as disclosed in said published European patent application No. 0 036 118, which is hereby incorporated.

DRAWINGS

Figure 1:
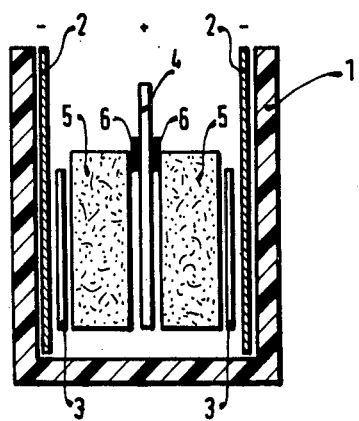
FIG. 1 is a section of a first embodiment, in which the electrodes are graphite foils.

The embodiment of FIG. 1 has a housing 1 made of a synthetic material capable of withstanding electrolyte including the solvent compound employed for the conducting salt, such as polypropylene. Adjacent to the inner walls of housing 1 are two sheet-metal plates 2, which provide for the contacts to both foil-shaped (i.e., sheet) electrodes 3. Instead of the metal plates 2, carbon fibers or a carbon fiber textile material can be used for the current feed. Between these foilshaped electrodes 3, which may be negative electrodes for example, is the foil-shaped electrode 4, which serves as the positive electrode. In between each of the two foil-shaped electrodes 3 and electrode 4, are located two felt separators 5 (or fiber webbed fabrics), which serve as a separator and also for electrolyte storage. Felt separators 5 have a thickness of about 1 to 2 mm, while the graphite foil electrodes 3 and 4 have a thickness between 0.1 to 0.5 mm, as is customary for commercially available expanded graphite foil material. The electrolyte is a 0.5 mol solution of tetrabutylammonium perchlorate in propylene carbonate, which is substantially contained in the felt separators 5. The well-known volume increase of graphite, which occurs upon the implantation of ions (or also of molecules), i.e., the doping procedure, between the lattice planes of the graphite, usually would lead to disintegration of these electrodes. Such disintegration of the graphite material can however be avoided by building the storage element in such a way that during the first charging step, mechanical pressure is built up, which prevents the disintegration of the electrodes. However, a protective foil or cover has to be provided for all parts of the electrode surfaces which are not exposed to this pressure during the charging step. Such a cover protects the electrode surfaces from ion implantation. This particularly concerns parts, such as the upper section of the foilshaped electrode 4, which project above the upper edge of the felt separators 5. Therefore, such parts of electrode 4, especially, are to be covered by protective element 6. It is self-evident that, as a result of the pressure buildup during the charging step, housing 1 has to be made sufficiently stiff so as not to buckle under this pressure. In addition, this build-up of pressure permits good contact between electrodes 3 and the sheet-metal plates 2, which serve as current leads.

Figure 2:
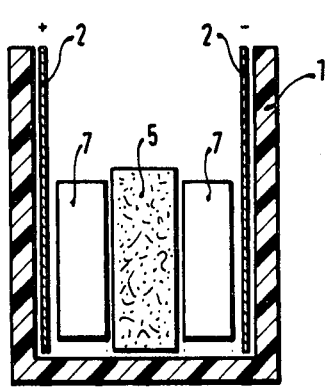
FIG. 2 is a section of a second embodiment, in which the electrodes are made of a graphite powder.

A second embodiment of the storage element is shown schematically in FIG. 2. In this embodiment, graphite powder is employed for the electrodes, instead of graphite foil. A housing 1 made of a synthetic material, is employed, as well as sheet-metal plates 2, which are used as contacts. The active electrodes 7 are made of packets of graphite powder and are between about 2 and 5 mm thick. The graphite powder is placed, for example, in shaped bags or packets made of a material which is pervious to the electrolyte (for example made of filter papers). The two graphite powder packets 7 are separated by a felt separator 5, which acts both as a separator and electrolyte storage element. When the electrode comprises graphite which has been doped with $FeCl_3$ on one side of the storage element, then the volume of this graphite powder packet 7 will change only little during charging. In this manner, it becomes possible to regulate the build-up of pressure during the first charging step. The electrolyte employed can be a 0.5 mol solution of tetrabutylammonium perchlorate in propylene carbonate.

It has proven advantageous in practice to perform the first charging step, which essentially constitutes the forming of the storage element by starting with a low charging current of about 2 to 5 $mA/cm^2$. This condition is maintained over a certain time period, after which the charging voltage is increased stepwise from about 3 to 3.5 and up to 4 to 4.5 volts.

For the embodiment of FIG. 1 employed as a secondary battery, the following results were obtained in operation of the storage element of FIG. 1, when employed as a secondary battery, with active electrodes weighing 0.368 g and an active electrode surface area of $18 \times 27$ mm. An open circuit voltage of 4 V, a short-circuit current of 270 mA, an internal resistance of 15 ohm, a capacity of 42 As (ampere seconds), and an energy content of 80 watts. The energy content per gram of electrode material is thus approximately 215 watts per gram. For further details see hereinafter.

In a variation of the above embodiment, in which γ-butyrolactone is employed as the solvent instead of propylene carbonate, an energy content of 230 watts per gram of electrode material was obtained.

Figure 3:
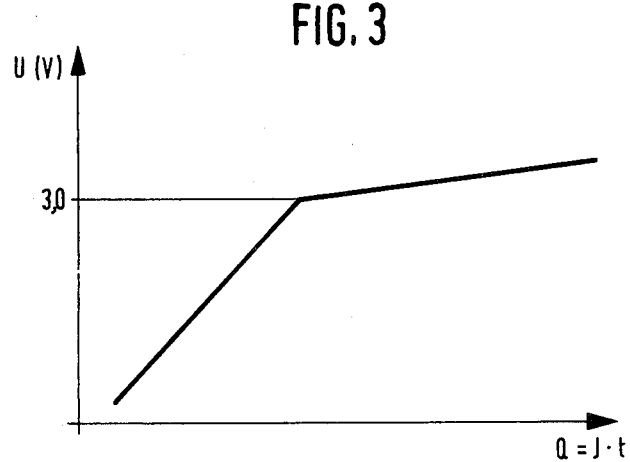
FIG. 3 shows a characteristic charging curve, with the storage element voltage drawn as a function of the charge.

A characteristic charging curve is shown in FIG. 3, with the voltage U shown as a function of charge Q. The voltage of the storage element increases initially in direct proportion to the charge received, up to a voltage of approximately 3 V. After this point, the voltage of the storage element increases only slightly with increasing charge. Up to a voltage of 3 V, the storage element behaves essentially as a capacitor, for which the wellknown relationship holds: $Q = C \cdot U$, where C represents the capacitance. When the capacitance is very high, 1 farad or more, the storage element can be used as a reserve voltage source, for example for computers to help prevent the loss of "memory" in case of a electricity failure. In some cases, it may be necessary to employ several such storage elements in series, in order to reach the required voltage. However, such a capacitor can be used only as a DC voltage source, since the charging of the unit is accomplished by ion transport. For alternating voltage the capacitance of such a condenser will drop very rapidly with increasing frequency of the charging alternating voltage.

Above a voltage of about 3 V, the storage element has the characteristics of a battery. The charge build-up of the battery is accompanied by only a slight increase in the voltage, while the discharge in this range is accompanied by a much slower drop in voltage than if the battery were charged to only about 3 V.

In general, the storage element can have electrodes and separators which are made of rolled components, which is similar to the structure of many capacitors. This permits use of a larger electrode surface within a relatively small space. Any solvent can be used for the electrolytes, provided it provides a sufficiently high conductivity for the electrolyte.

When compared with the storage element of the prior art using polyacetylene electrodes, the storage element of the present invention has the advantage that the graphite is more widely available and considerably cheaper than the polyacetylene. The storage element of the present invention has the further advantage that the graphite electrodes, when not doped, have lower internal resistance which permits higher electrical currents to be drawn from them. The storage elements of the present invention have the further advantage that graphite is not sensitive to oxygen and water. Thus, preparation of the storage element is considerably simplified and it is not necessary to establish procedures to exclude oxygen during the manufacturing process. Water need only be controlled to the extent required to permit the storage element to eventually reach the desired higher battery voltage. Because of the foregoing and the high durability of graphite electrodes, the storage element has a long service life.

A. Since the ion implantation takes place only in the crystalline areas, the graphite used should have a highest possible crystalline portion and the crystallites should be built up as well and perfectly as possible.

The high-crystalline natural graphite of the Bavarian or Rhodesian mining areas are preferably used, e.g. the commercially available natural graphite of the firm Kropfmühl in Bavaria. The graphite may be used in the form of a powder or in the form of a foil. Such foils made of "Kropfmühl" graphite are commercially available by the firm Sigri under the tradename "SIGRAFLEX". These foils are made of expanded graphite: the graphite powder is expanded with sulfuric acid and then these graphite flakes are rolled to the above mentioned foils.

B. Construction according to FIG. 1

Middle electrode 4: Sigraflex 0.35 mm thick, positive pole

Outer electrode 2: Sigraflex 0.20 mm thick, negative pole parallel

Separators 5:
1 layer filter paper 0.15 mm thick (Blauband type 583³)
1 layer fleece 2.5 mm thick, made of Nomex fibers (type Viledon T 1162 of the firm Freudenberg)
1 layer filter paper 0.15 mm thick (Blauband type 583³)

Electrolyte: 1.0 molar solution tetrabutylammonium perchlorate in propylene carbonate.

Before operation the battery parts and the electrolyte are dried by warming up to 60° C. under vacuum. Operation of the battery takes place under exclusion of water and oxygen. In the laboratory this was achieved by operation of the battery in the desiccator under argon gas.

In the first charging cycle the current was limited to 10 mA at a voltage of 4.5 V. In the following cycles the battery was charged with 4.5 V without limiting the current. Duration of charging until the current decreased down to about 3.5 mA at 4.5 V.

When a graphite type predoped with $FeCl_3$ is used for building up the battery, the following commercially available product is applied: Graphimet by Alfa Products, Venton Division with 8.7% by weight $FeCl_3$ in the graphite.

We claim:

1. An electric energy storage element, comprising
a housing structure;
at least one positive electrode mounted within the housing;
at least one negative electrode mounted within the housing and spaced from said at least one positive electrode; and
an ionic electrolyte in contact with said electrodes;
said at least one positive electrode and at least one negative electrode each comprising an ion pervious graphite having ions which are formed from ions from said electrolyte stored in the graphite lattice.

2. The storage element of claim 1, wherein said graphite is doped.

3. The storage element of claim 2, wherein said graphite, before the storage element has been charged, is doped with $FeCl_3$.

4. The storage element of claim 1, wherein said graphite is an expanded graphite sheet.

5. The storage element of claim 1, wherein said electrodes comprise highly graphitized fibers.

6. The storage element of claim 1, wherein the electrolyte comprises a conducting salt which dissociates into single valence ions, and a polar solvent.

7. The storage element of claim 6, wherein the conducting salt is selected from the group consisting of the chlorides and perchlorides of lithium, potassium, sodium and tetraakylammonium.

8. The storage element of claim 6 or claim 7, wherein the polar solvent is selected from the group consisting of propylene carbonate, gamma-butyrolactone and dimethylformamide.

9. The storage element of claim 7, wherein the conducting salt has a concentration of between 0.5 mol per liter of electrolyte up to saturation.

10. The storage element of claim 8, wherein the conducting salt has a concentration of between 0.5 mol per liter of electrolyte up to saturation.

11. The storage element of claim 1, which is charged and used as a secondary battery.

12. The storage element of claim 1, which is charged and used as a condenser for DC voltage having a capacitance of at least 1 F.

* * * * *